United States Patent
Sugita et al.

(10) Patent No.: US 10,237,425 B2
(45) Date of Patent: Mar. 19, 2019

(54) IMAGE PROCESSING APPARATUS ASSOCIATING WITH EXTERNAL APPARATUS, CONTROL METHOD, AND STORAGE MEDIUM

(71) Applicant: CANON KABUSHIKI KAISHA, Tokyo (JP)

(72) Inventors: Hikaru Sugita, Toride (JP); Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/495,559

(22) Filed: Apr. 24, 2017

(65) Prior Publication Data
US 2018/0103160 A1 Apr. 12, 2018

(30) Foreign Application Priority Data
Oct. 6, 2016 (JP) .................................. 2016-198134

(51) Int. Cl.
*H04N 1/00* (2006.01)
*H04N 1/32* (2006.01)
*H04N 1/44* (2006.01)

(52) U.S. Cl.
CPC ..... *H04N 1/00228* (2013.01); *H04N 1/00925* (2013.01); *H04N 1/00973* (2013.01); *H04N 1/32122* (2013.01); *H04N 1/32529* (2013.01); *H04N 1/4433* (2013.01); *H04N 2201/0055* (2013.01); *H04N 2201/0094* (2013.01)

(58) Field of Classification Search
CPC ...................... H04N 1/00228; H04N 1/00925
See application file for complete search history.

(56) References Cited

U.S. PATENT DOCUMENTS

| | | | | |
|---|---|---|---|---|
| 6,633,759 B1 * | 10/2003 | Kobayashi | .......... | H04M 1/7253 455/418 |
| 7,593,141 B2 * | 9/2009 | Chiu | ........................ | H04N 1/00 348/101 |
| 8,976,389 B2 * | 3/2015 | Sako | ..................... | G06F 3/1204 358/1.1 |
| 9,218,147 B2 * | 12/2015 | Kawaura | ............... | G06F 3/1207 |
| 2009/0029701 A1 * | 1/2009 | Mishima | ........... | H04L 29/12103 455/435.1 |

(Continued)

FOREIGN PATENT DOCUMENTS

JP 2016-21614 A 2/2016

*Primary Examiner* — Ibrahim Siddo
(74) *Attorney, Agent, or Firm* — Canon USA Inc., IP Division

(57) ABSTRACT

An image processing apparatus including a transmission function for transmitting an image sets whether to permit use of a destination not previously registered. The image processing apparatus also receives, from an external apparatus, data including at least a destination field. The image processing apparatus sets the transmission destination based on destination information included in the destination field of the received data upon a condition that a setting is set permitting use of a previously un-registered destination and does not set the transmission destination based on the destination information included in the destination field of the received data upon a condition that a setting is set prohibiting use of a previously un-registered destination.

14 Claims, 12 Drawing Sheets

(56) References Cited

U.S. PATENT DOCUMENTS

| | | | | |
|---|---|---|---|---|
| 2013/0258381 A1* | 10/2013 | Sato | ...................... | G06F 3/1297 358/1.13 |
| 2015/0055766 A1* | 2/2015 | Kondo | .................... | H04M 3/54 379/100.06 |
| 2016/0150120 A1* | 5/2016 | Inoue | ................. | H04N 1/32096 358/440 |

\* cited by examiner

FIG.4A
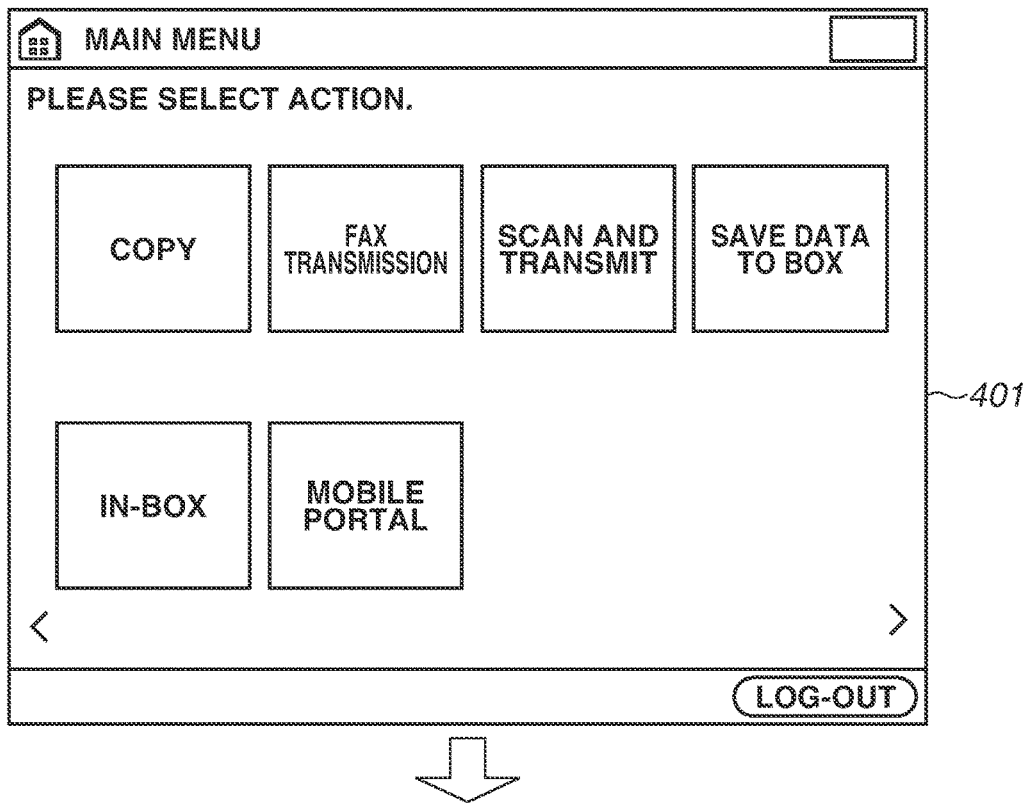
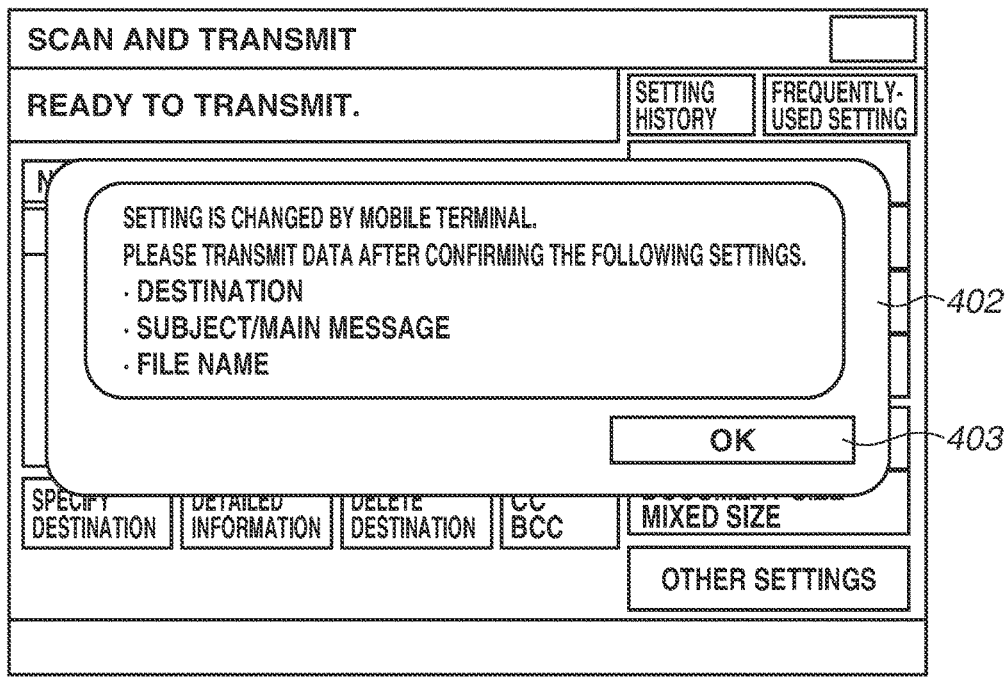
FIG.4B

SCAN AND TRANSMIT — 404

READY TO TRANSMIT.

| SETTING HISTORY | FREQUENTLY-USED SETTING |

NUMBER OF DESTINATIONS: 1 — 405 test@example.com

AUTO-SETTING

300 × 300 dpi

AUTO-SIZE

PDF (HIGH COMPRESSION)

TWO-SIDED DOCUMENT

DOCUMENT SIZE MIXED SIZE

SPECIFY DESTINATION | DETAILED INFORMATION | DELETE DESTINATION | CC BCC

OTHER SETTINGS

406

⬇ 407

CONFIRM E-MAIL DESTINATION

<E-MAIL>
PLEASE INPUT E-MAIL ADDRESS

E-MAIL ADDRESS | test@example.com — 408

· DATA DIVISION   ON   OFF

CANCEL          OK

FIG.5A
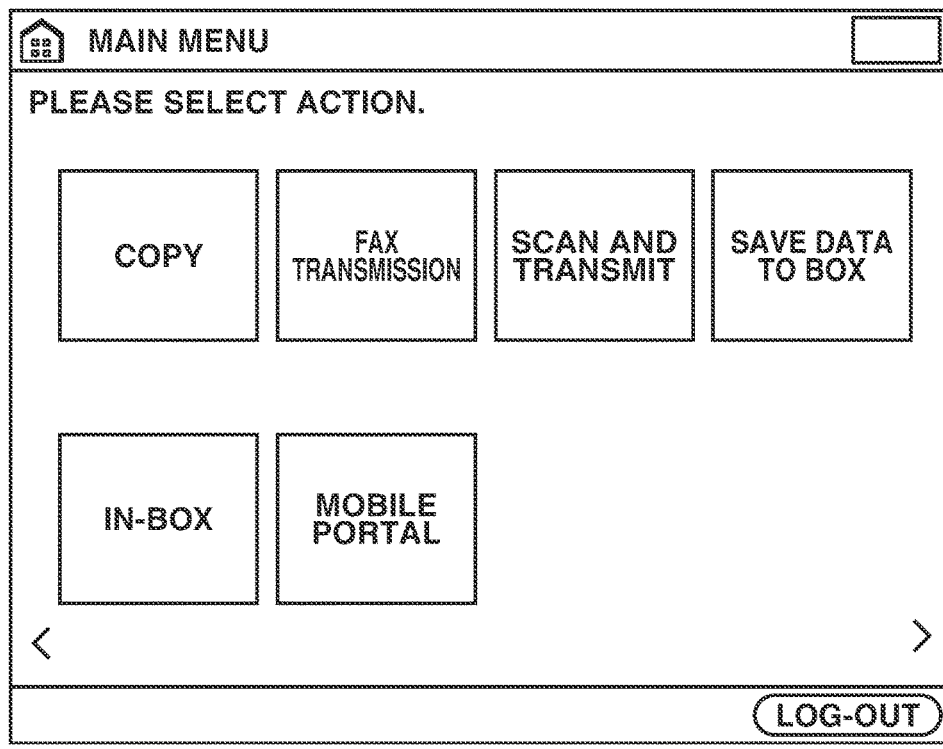
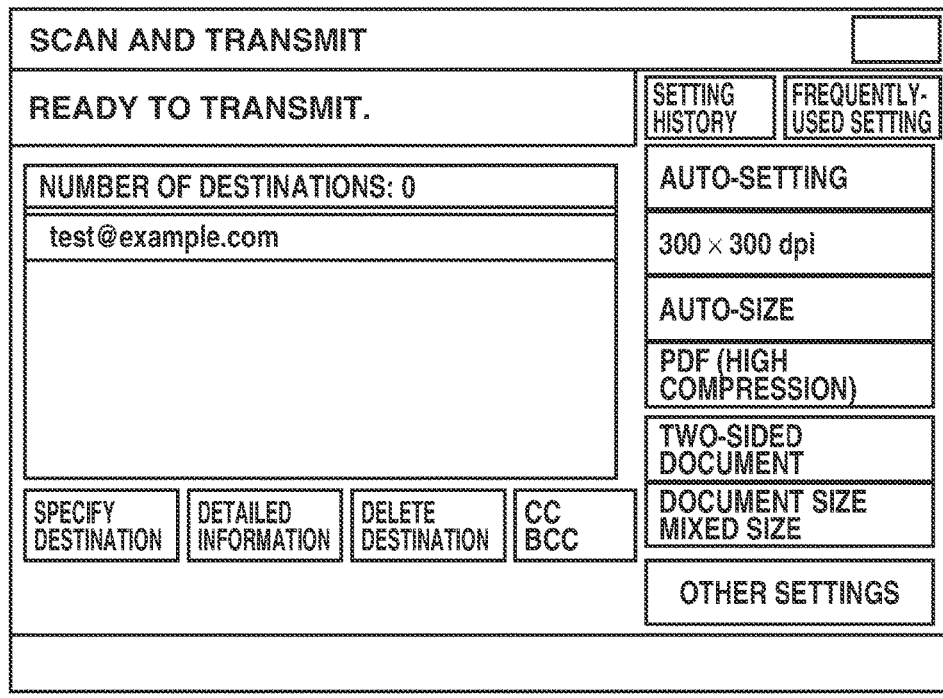

FIG.5B
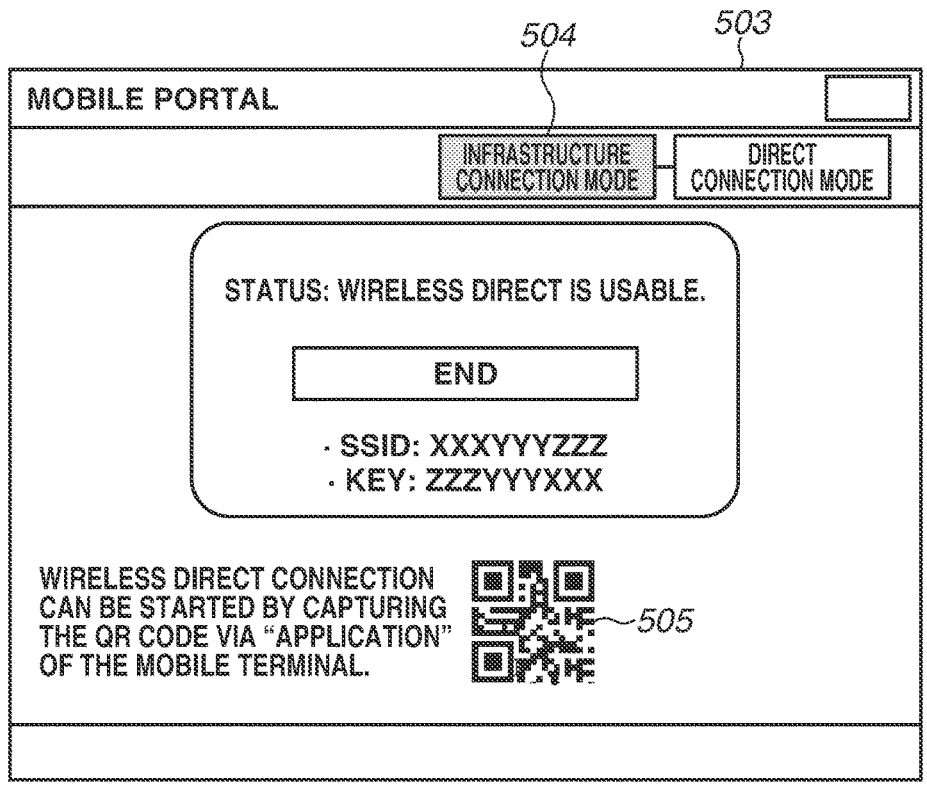
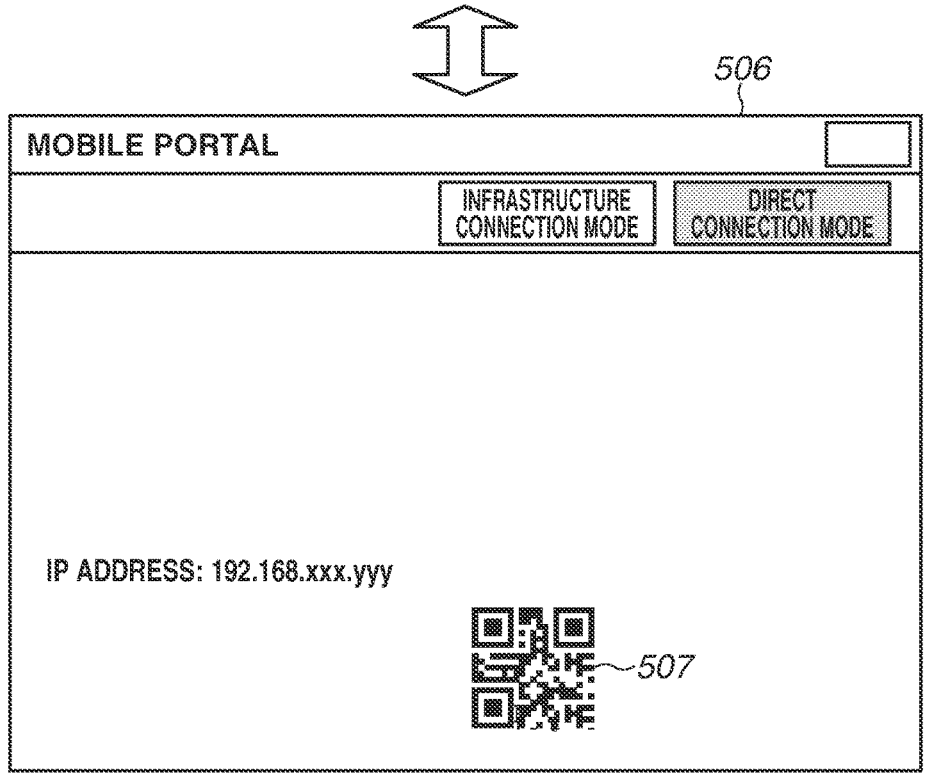

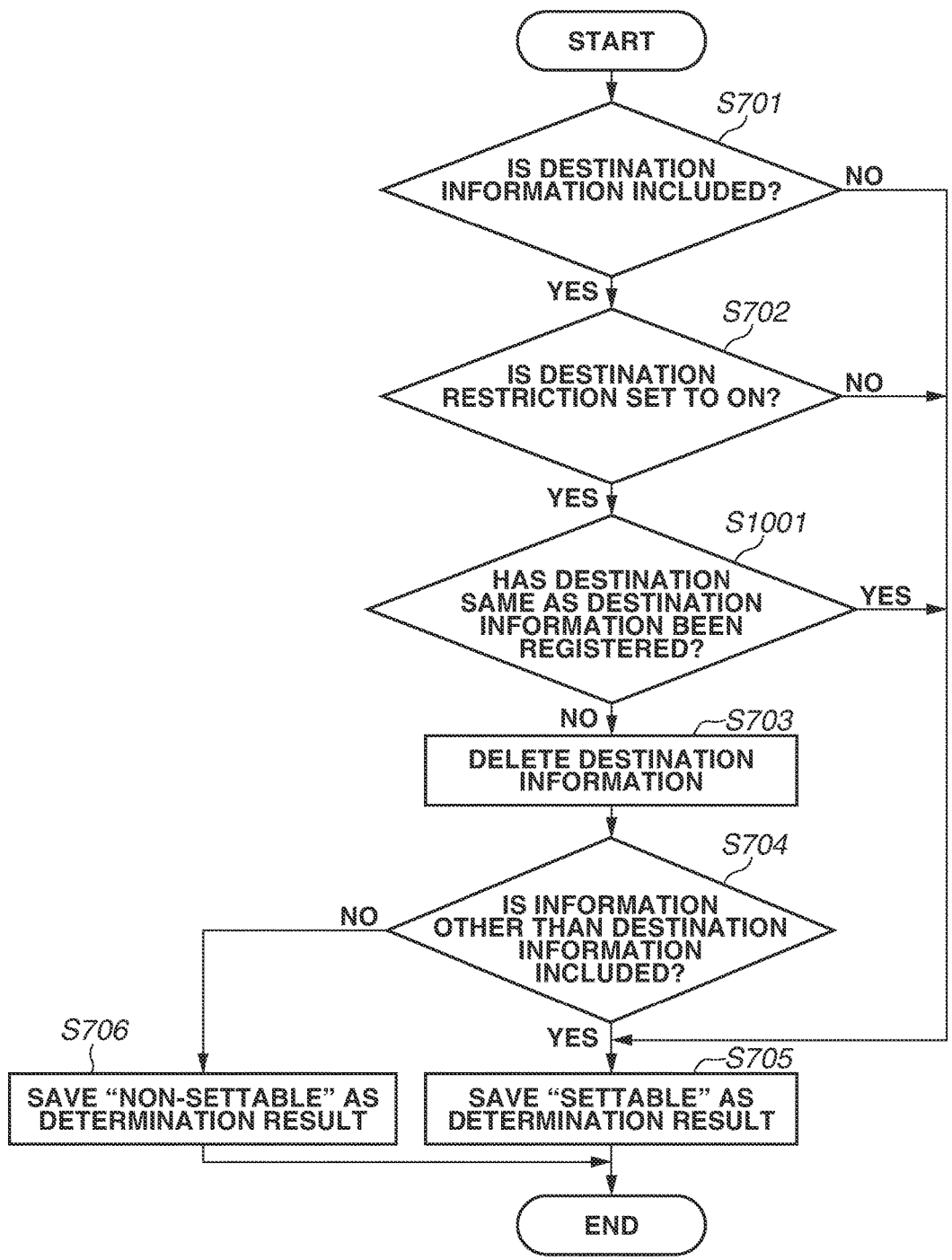

IMAGE PROCESSING APPARATUS ASSOCIATING WITH EXTERNAL APPARATUS, CONTROL METHOD, AND STORAGE MEDIUM

BACKGROUND

Field

The present disclosure relates to an image processing apparatus associating with an external apparatus.

Description of the Related Art

Image processing apparatuses associating with external apparatuses such as communication terminals have been known. For example, an image processing apparatus discussed in Japanese Patent Application Laid-Open No. 2016-21614 receives destination information stored in a communication terminal and displays the received destination information on a panel provided on the image processing apparatus. The destination information received from the communication terminal and displayed on the panel is specified as a transmission destination used by a transmission application installed in the image processing apparatus according to a user operation performed via the panel.

In this regard, a setting called "destination restriction" is known in the field of image processing apparatuses such as multifunction peripherals (MFPs). The "destination restriction" is a setting in which a user is permitted to specify a transmission destination from destinations previously registered in an address book and is prohibited from specifying a destination other than destinations registered in the address book by, for example, directly inputting a destination.

SUMMARY

According to an aspect of the present invention, a control method, which is executed by a processor, of an image processing apparatus including a transmission function for transmitting an image includes transmitting an image to a set transmission destination, setting whether to permit use of a previously un-registered destination as a transmission destination to which the image is transmitted, receiving data including at least a destination field from an external apparatus, and controlling the image processing apparatus to set the transmission destination based on destination information included in the destination field of the received data upon a condition that a setting is set permitting use of a previously un-registered destination and not to set the transmission destination based on the destination information included in the destination field of the received data upon a condition that a setting is set prohibiting use of a previously un-registered destination.

Further features will become apparent from the following description of exemplary embodiments with reference to the attached drawings.

BRIEF DESCRIPTION OF THE DRAWINGS

FIGS. 4 (4A and 4B) is a diagram illustrating an example of transition of screens.

FIGS. 5 (5A and 5B) is a diagram illustrating examples of acceptance screens.

FIG. 10 is a flowchart illustrating destination determination processing according to a second exemplary embodiment.

DESCRIPTION OF THE EMBODIMENTS

Hereinafter, exemplary embodiments will be described with reference to the appended drawings.

In many cases, a destination specified by an external apparatus such as a communication terminal is different from a destination registered in an address book of a multifunction peripheral (MFP). However, conventionally, a setting method in which the MFP accepts the specification of the destination in association with the communication terminal has not been taken into consideration. In other words, conventionally, in a case where the MFP accepts the specification of the destination from the communication terminal in a state where a setting of the destination restriction is enabled, as to how the MFP operates in the above state has not been taken into consideration.

In consideration of the above-described situation, description will be given to the following exemplary embodiment that enables the MFP to appropriately restrict setting of destination information made in association with the external apparatus.

Figure 1:
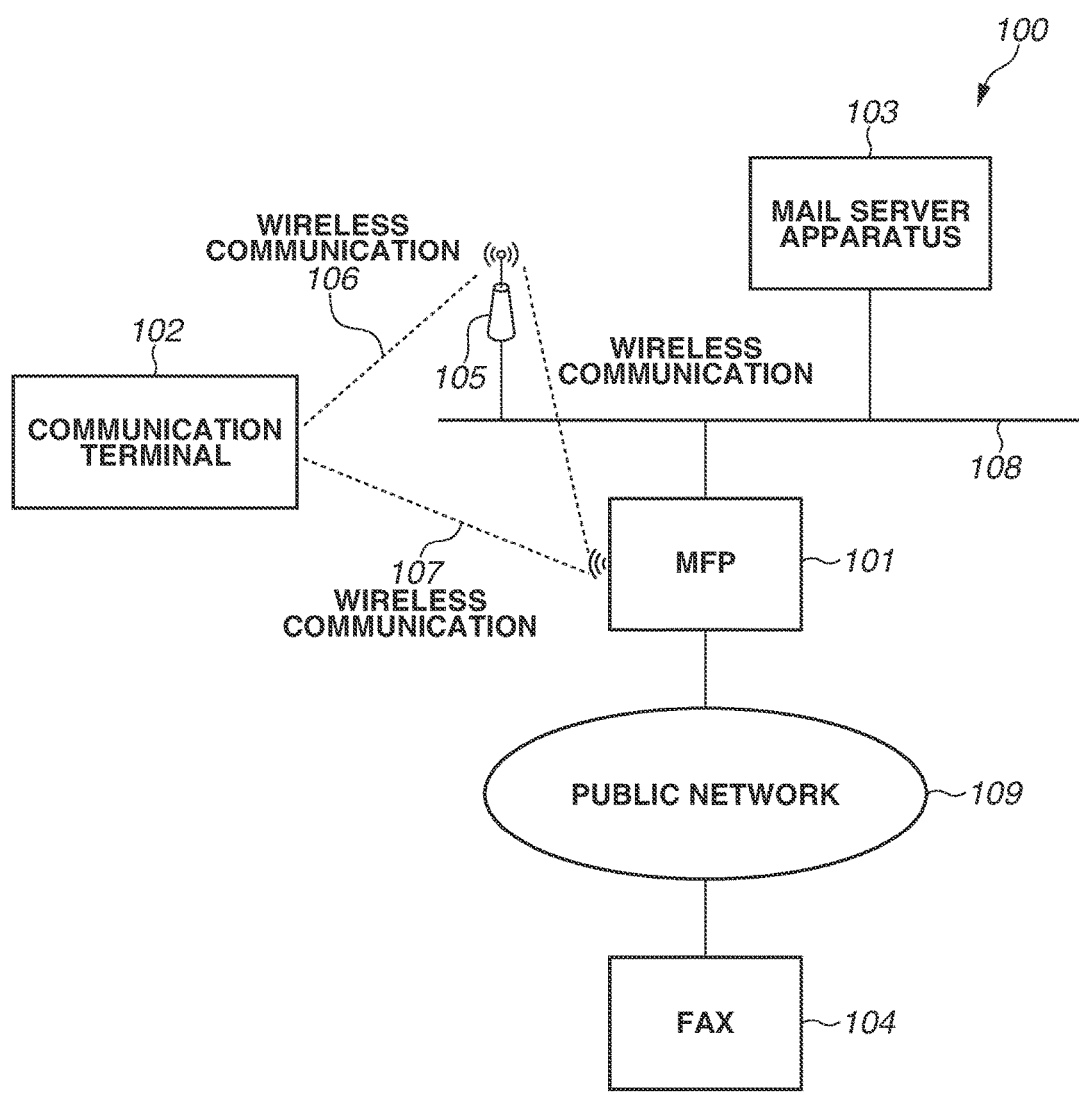
FIG. 1 is a diagram illustrating a general view of an image processing system according to a first exemplary embodiment.

FIG. 1 is a diagram illustrating a general view of an image processing system 100 according to a first exemplary embodiment. An MFP 101, a mail server apparatus 103, and an access point 105 are communicably connected to a network 108. The MFP 101 is an example of an image processing apparatus. The MFP 101 and a FAX 104 are communicably connected to a public network 109. A communication terminal 102 is connected to the access point 105 via wireless communication 106, while mutually and communicably connected to the mail server apparatus 103 and the MFP 101 via the network 108. The MFP 101 also includes a wireless communication function, so as to be able to directly connect to the communication terminal 102 or the access point 105 via wireless communication 107.

In order to transmit image data of a scanned document as an attachment file of an electronic mail (e-mail), the MFP 101 specifies a mail address of a transmission destination as a transmission destination and transmits the e-mail to the mail server apparatus 103. The mail server apparatus 103 stores received e-mail in a mailbox provided in local memory (not illustrated) or transfers the received e-mail to an external mail server.

A user operates a below-described operation unit 116 of the MFP 101 to input setting information that includes at least any of a transmission destination, a subject of an e-mail, a main message of an e-mail, or a file name of image data to be transmitted, which is necessary for the MFP 101 to transmit the image data. The user can input the above setting information by operating the communication terminal 102 serving as an external apparatus of the MFP 101. The communication terminal 102 transmits the setting information to the MFP 101. The MFP 101 receives the setting information transmitted from the communication terminal 102 and uses the setting information as a setting for transmitting the image data.

Figure 2:
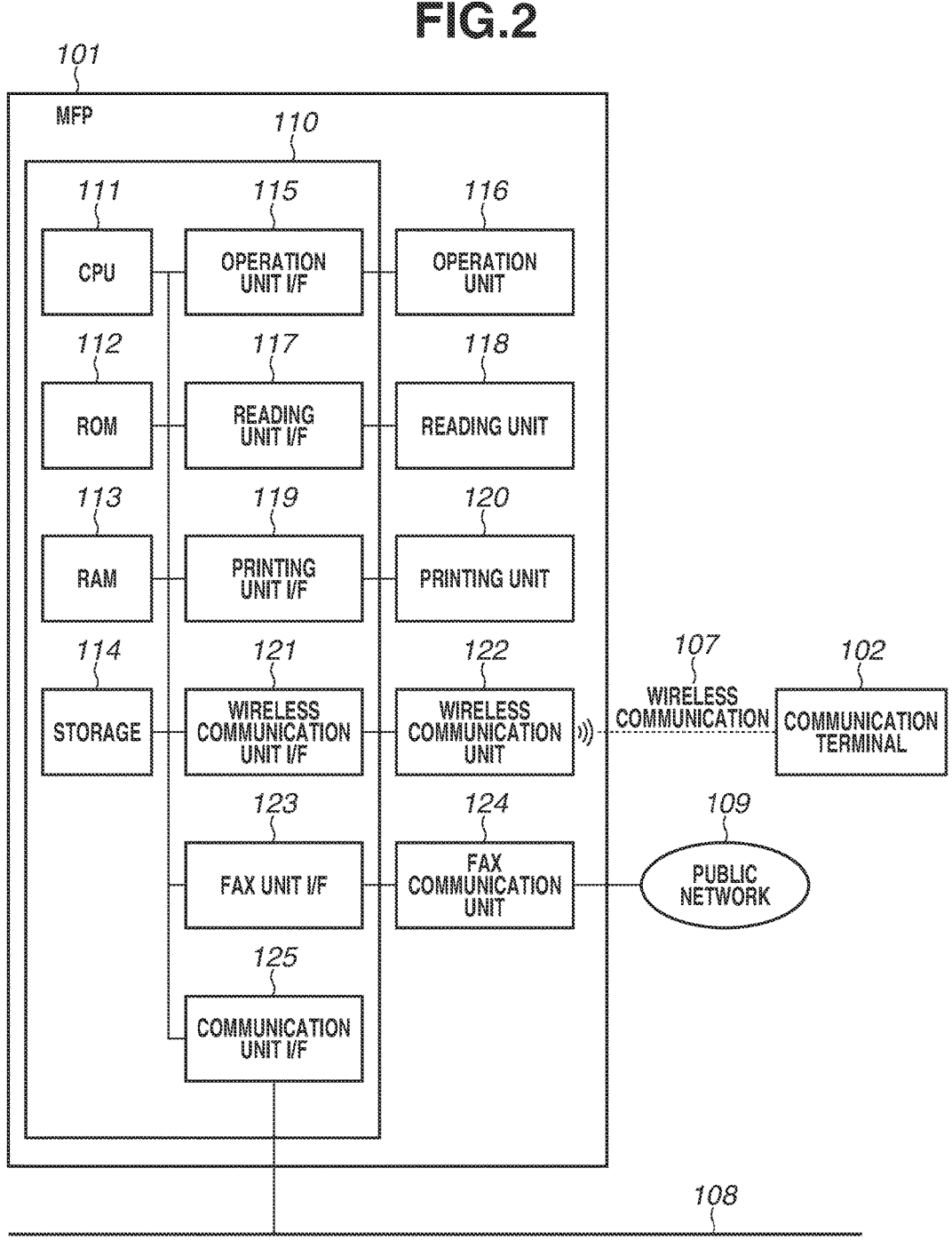
FIG. 2 is a block diagram illustrating a hardware configuration of a multifunction peripheral (MFP).

FIG. 2 is a block diagram illustrating a hardware configuration of the MFP 101. A control unit 110 including a central processing unit (CPU) 111 controls general operation of the MFP 101. The CPU 111 reads a control program stored in a read only memory (ROM) 112 or a storage 114 and executes various kinds of control, such as reading control and printing control. The ROM 112 stores a control program that can be executed by the CPU 111. The ROM 112 also stores a boot program and font data. A random access memory (RAM) 113 is a main memory or a work area of the CPU 111, and is used as a temporary storage area for loading various control programs stored in the ROM 112 or the storage 114. The storage 114 stores image data, print data, various programs, and various types of setting information. In the present exemplary embodiment, while a flash memory is assumed as the storage 114, an auxiliary storage device can be used. A solid state drive (SSD), a hard disk drive (HDD), and an embedded multimedia card (eMMC) are examples of auxiliary storage devices. The function or processing of the MFP 101 described below can be realized by the CPU 111 by reading and executing the program stored in the ROM 112 or the storage 114.

In the MFP 101 of the present exemplary embodiment, while a single CPU 111 uses a single memory (i.e., RAM 113) to execute respective processing steps illustrated in the below-described flowchart, the exemplary embodiment is not limited thereto. For example, the MFP 101 can include a plurality of CPUs, RAMs, ROMs, and storages, so that respective processing steps illustrated in the below-described flowchart can be cooperatively executed thereby. A part of the processing steps can be executed by using a hardware circuit such as an application specific integrated circuit (ASIC) or a field-programmable gate array (FPGA).

An operation unit interface (I/F) 115 connects the operation unit 116 and the control unit 110. The operation unit 116 functions as a display unit for displaying information to the user as well as an acceptance unit for accepting an operation input from the user. A reading unit I/F 117 connects a reading unit 118 and the control unit 110. The reading unit 118 scans a document and generates image data. The image data generated by the reading unit 118 is stored in the RAM 113 or the storage 114. The stored image data is transmitted to the external apparatus or printed on a recording sheet.

A printing unit I/F 119 connects a printing unit 120 and the control unit 110. The CPU 111 transfers the image data stored in the RAM 113 (i.e., image data as a printing target) to the printing unit 120 via the printing unit I/F 119. The printing unit 120 prints the transferred image data onto a recording sheet fed from a sheet feeding cassette (not illustrated).

A wireless communication unit I/F 121 is an interface for controlling a wireless communication unit 122, which connects the control unit 110 and an external wireless communication device (herein, communication terminal 102) via the wireless communication 107. The control unit 110 controls a FAX communication unit 124 through a FAX unit I/F 123 to connect to the public network 109. The FAX unit I/F 123 is an interface for controlling the FAX communication unit 124, which enables the control unit 110 to connect to the public network 109 or execute control of a facsimile communication protocol by controlling a facsimile communication modem or a network control unit (NCU).

The communication unit I/F 125 connects the control unit 110 and the network 108. The communication unit I/F 125 transmits image data or various types of internal apparatus information to the external apparatus connected to the network 108 and receives print data or various types of information from an information processing apparatus connected to the network 108. Transmission or reception using the above-described e-mail and file transmission using the other protocols (e.g., file transfer protocol (FTP), server message block (SMB), and Web-based distributed authoring and versioning (WebDAV)) can be executed via the network 108. The communication unit I/F 125 includes a Web server function to enable a personal computer (PC) (not illustrated) connected to the network 108 to display a transmission/reception job history or various types of setting information via access from the communication terminal 102 through the hypertext transfer protocol (HTTP).

Figure 3:
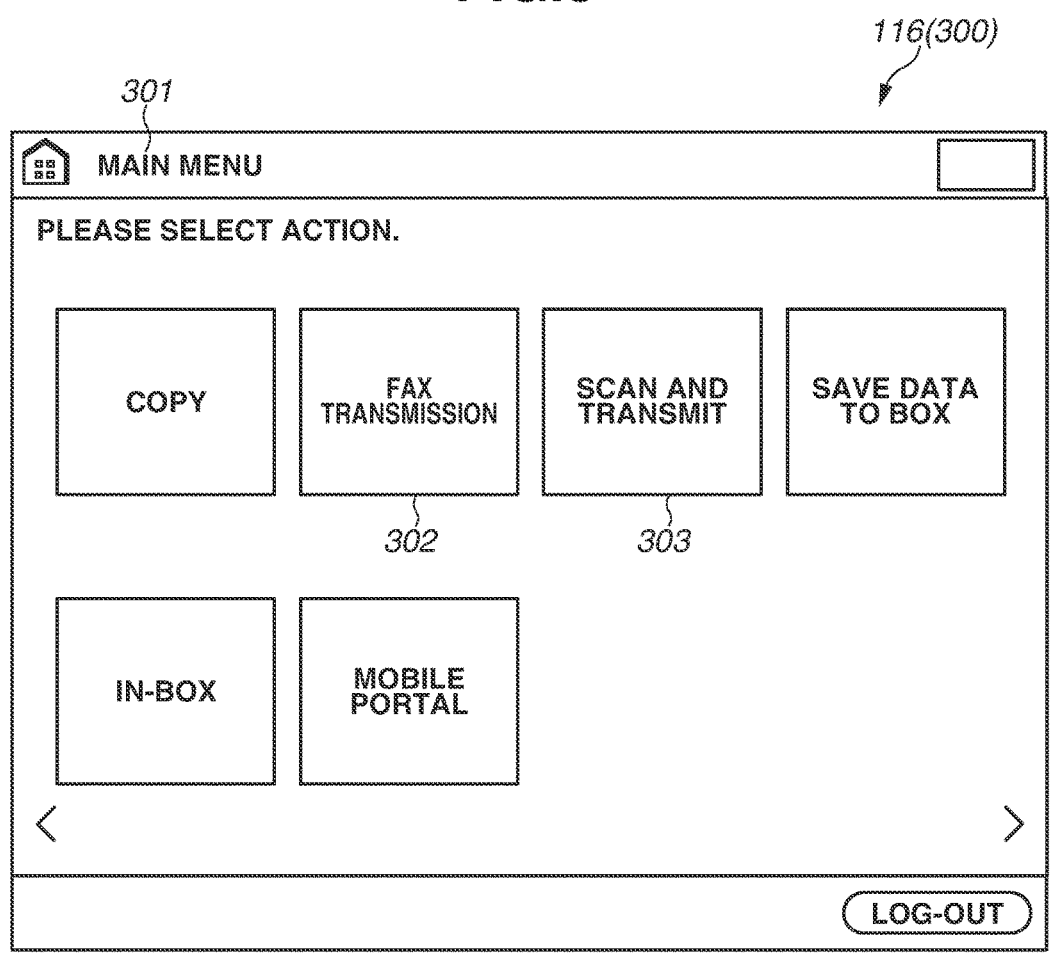
FIG. 3 is a diagram illustrating an external view of an operation unit.

FIG. 3 is a diagram illustrating an external view of the operation unit 116. The operation unit 116 includes a touch panel 300 for displaying an operation screen. The touch panel 300 also functions as an acceptance unit that accepts an instruction (i.e., touch, drag, or flick) from a user. The user directly touches each image (i.e., touch image) of a screen displayed on the touch panel 300 with an object such as a finger or a stylus pen to instruct execution of each function according to the displayed image. Herein, the touch image refers to an image for causing a user to touch a divided region where the image is displayed to execute a control function associated with that display area. In the example of FIG. 3, a home screen is displayed on the touch panel 300. The home screen is a screen for selecting respective functions provided by the MFP 101, such as a copy function, a fax transmission function 302, and a scan and transmit function 303. A title 301 indicating the home screen is displayed on the upper portion of the home screen. In addition, the operation unit 116 can be provided with hardware keys in addition to the touch panel 300.

Next, functions included in the MFP 101 will be described. The fax transmission function 302 provides a user with a transmission function for transmitting an image read and acquired from a document through facsimile transmission. When the fax transmission function 302 is selected, the MFP 101 displays a facsimile transmission screen (not illustrated). The user can specify a destination by directly inputting a phone number to the facsimile transmission screen through a software keyboard (not illustrated).

When a start key (not illustrated) is pressed in a state where the facsimile transmission screen is displayed thereon, the MFP 101 transmits the image read and acquired from a document by the reading unit 118 to a destination specified by the user through facsimile transmission. The scan and transmit function 303 provides a user with a transmission function for transmitting an image read and acquired from a document via the network. When the scan and transmit function 303 is selected, the MFP 101 displays a transmission setting screen (not illustrated). The user can newly input a communication method or a transmission destination used for transmission through the transmission setting screen.

For example, the user can select a transmission method such as e-mail transmission, SMB transmission, FTP transmission, or internet facsimile (I-fax) transmission from the transmission setting screen to input a destination. The user can specify a destination registered in the address book as a destination used for transmission. In the present exemplary embodiment, the address book is stored in the storage 114 of the MFP 101. A plurality of transmission destinations can be registered in the address book, so that the user can save time and effort of manually inputting a destination at each time of transmission. The destinations can be previously registered in the address book by an administrator of the MFP 101.

In the present exemplary embodiment, while the address book is stored in the storage 114, the exemplary embodiment is not limited thereto. For example, the address book can be uniformly managed by a different server apparatus. In this case, the MFP 101 specifies a destination from the address book by referring to the address book stored in the different server apparatus. For example, the MFP 101 can refer to the address book registered in an external lightweight directory access protocol (LADP) server.

The MFP 101 can receive setting data used for the scan and transmit function 303 from the communication terminal 102. The data received from the communication terminal 102 includes a mail address field, a subject field, a main message field, and a file name field. The mail address field can store destination information in a format of an e-mail address. The mail address field can store one or more pieces of destination information.

The subject field can store a subject of the e-mail. The main message field can store a main message of the e-mail. The file name field can store a file name used when an image acquired by the MFP 101 through scanning is attached to the e-mail as an attachment file. Information is stored in at least one or more fields included in the data received from the communication terminal 102.

FIGS. 4 (4A and 4B) is a diagram illustrating operation of the MFP 101 when the MFP 101 receives data of an e-mail transmission destination from the communication terminal 102 as the setting information. In FIGS. 4 (4A and 4B), transition of screens displayed on the touch panel 300 of the MFP 101 will be described. The first screen in FIGS. 4 (4A and 4B) is a home screen 401. The home screen 401 is a screen at which the MFP 101 can receive the setting information from the communication terminal 102. In a state where the home screen 401 is displayed on the touch panel 300, the CPU 111 receives the setting information from the communication terminal 102 and displays a pop-up 402 (i.e., pop-up screen) if content of the received setting information is determined as normal.

The pop-up 402 displays the information for notifying the user that the setting information, such as a destination or a transmission setting of the e-mail, has been received from the communication terminal 102 via the wireless communication 106 or the network 108. In addition, a confirm button for confirming the details of the setting information can be displayed on the pop-up 402, so that the content of the setting information received from the communication terminal 102 can be displayed on a detail display screen after the user presses the confirm button.

The content of the setting information can be setting information of various kinds, i.e., an e-mail address as a destination of the e-mail, a subject of the e-mail, a main message, or a file name of an image file attached thereto, which are specified when the e-mail is transmitted. The e-mail address can be set from an address book of the communication terminal 102 or can be directly input thereto through an application installed in the communication terminal 102. An OK button 403 for closing the pop-up display is displayed on the pop-up 402. When the MFP 101 detects that the OK button 403 is selected by the user, the screen is shifted to a scan and transmit screen 404, and the received setting information is reflected on a destination that is used for the scan and transmit function 303.

The scan and transmit screen 404 is a screen for the user to execute setting of the scan and transmit function 303 provided by the MFP 101. The screen in FIGS. 4 (4A and 4B) illustrates a state where the MFP 101 receives one destination of the e-mail from the communication terminal 102. A number of destinations 405 is information indicating the number of destinations currently set thereto. When the MFP 101 detects that detailed information 406 is selected, an e-mail destination confirmation screen 407 is displayed thereon. The information indicating a destination currently set thereto is displayed on the e-mail destination confirmation screen 407 as destination information 408. The user can edit the destination through the e-mail destination confirmation screen 407.

In addition, when the MFP 101 detects that a reset key (not illustrated) is pressed in the scan and transmit screen 404, the MFP 101 clears a setting of the transmission function. At this time, the received destination information is cleared, and communication with the communication terminal 102 that transmits the destination information is also reset. When the MFP 101 detects that a start key (not illustrated) is pressed at the scan and transmit screen 404, the MFP 101 starts transmission processing of the image.

In the transmission processing, the MFP 101 transmits the image read and acquired from a document to the specified destination. When the e-mail address is specified as the destination, the MFP 101 transmits the image by attaching the image as an attachment file of the e-mail. In addition, if the setting information includes a transmission setting such as a subject, a main message, or a file name, the MFP 101 transmits the e-mail to which the setting is applied. After the transmission has been completed, the destination information and the transmission setting are cleared, and communication with the communication terminal 102 that transmitted the setting information is also reset.

Next, communication executed by the MFP 101 and the communication terminal 102 will be described. The MFP 101 communicates with the communication terminal 102 using an HTTP protocol. In the present exemplary embodiment, a session identification (ID) is used for managing a connection of the MFP 101 and the communication terminal 102. The MFP 101 receives a connection request from the communication terminal 102 and determines whether to permit the connection. When the connection is permitted, the MFP 101 generates a session ID for identifying a terminal connected thereto, and transmits the session ID to the communication terminal 102. The generated session ID is temporarily stored in the RAM 113.

When the communication terminal 102 transmits the setting information to the MFP 101, the communication terminal 102 transmits the setting information to which the session ID received from the MFP 101 is attached. The MFP 101 determines whether the session ID received together with the setting information matches with the session ID stored in the RAM 113. When the session IDs match each other, the MFP 101 accepts the setting information from the communication terminal 102. If the session IDs do not match each other, the MFP 101 cancels the setting information transmitted from the communication terminal 102. Through the processing, the MFP 101 can associate with only the communication terminal 102 permitted to connect to the MFP 101.

The MFP 101 of the present exemplary embodiment includes an upper limit in number of terminals simultaneously connectable to the MFP 101. Accordingly, at a timing at which the above-described transmission is completed or a reset key is pressed, the MFP 101 cancels the connection with the communication terminal 102. The MFP 101 cancels the session ID temporarily stored in the RAM 113 and disconnects the communication session with the communication terminal 102. If the number of terminals simultaneously connecting to the MFP 101 is less than the upper limit number of terminals simultaneously connectable thereto, the MFP 101 can accept a connection from another external terminal.

FIGS. 5 (5A and 5B) is a diagram illustrating examples of acceptance screens for accepting the setting information from the communication terminal 102. In the present exemplary embodiment, a home screen 501 (main menu), an e-mail transmission screen 502 (scan and transmit), mobile portal screens 503 and 506 (mobile portal) are set as the acceptance screens. Because the screens at which the MFP 101 can receive the setting information from the communication terminal 102 are restricted, a user who operates screens other than the acceptance screens is prevented from being interrupted by the pop-up 402 displayed when the setting information is received.

The home screen 501 is a default stand-by screen of the MFP 101. The e-mail transmission screen 502 is a screen displayed when the e-mail is to be transmitted, and the setting information received from the communication terminal 102 is set as a setting of the transmission function when the OK button 403 provided on the displayed pop-up 402 is pressed. In addition, the MFP 101 adds and sets the e-mail transmission destination if an e-mail address is received as the setting information, and overwrites and sets the setting information if information such as a subject, a main message, or a file name is received as the setting information.

The mobile portal screens 503 and 506 are setting screens for connecting the communication terminal 102 and the MFP 101. When the MFP 101 detects user selection of a mobile portal displayed on the home screen 501, the MFP 101 displays the mobile portal screen 503 (506). Connection information for executing wireless communication (called as "direct wireless communication") between the communication terminal 102 and the MFP 101 without interposing the external access point is displayed on the mobile portal screen 503.

The user sets a service set identifier (SSID) and a security key displayed on the mobile portal screen 503 to the communication terminal 102, so that the communication terminal 102 can execute direct wireless communication with the MFP 101. A quick response code (QR Code®) 505 is a two-dimensional code that stores information about a wireless connection setting. The communication terminal 102 acquires the connection information by capturing an image of the QR Code® using a camera included in the communication terminal 102 and establishes the direct wireless communication with the MFP 101.

The mobile portal screen 506 is a screen that displays connection information for executing communication between the MFP 101 and the communication terminal 102 via the external access point. The mobile portal screens 503 and 506 can be switched by the user operation. The communication terminal 102 acquires an internet protocol (IP) address of the MFP 101 as a destination used for communicating with the MFP 101 by capturing a QR Code® 507 displayed on the mobile portal screen 506 using a camera included in the communication terminal 102. The communication terminal 102 communicates with the MFP 101 using the acquired IP address.

If the MFP 101 receives the setting information from the communication terminal 102 in a state where the screen illustrated in FIGS. 5 (5A and 5B) is displayed on the operation unit 116, the MFP 101 displays the pop-up 402 illustrated in FIGS. 4 (4A and 4B) and reflects the received setting information on the e-mail transmission screen 502 ("scan and transmit") after the OK button 403 is pressed. If the MFP 101 receives the setting information from the communication terminal 102 in a state where a screen (e.g., copy function screen) other than the screen illustrated in FIGS. 5 (5A and 5B) is displayed on the operation unit 116, the MFP 101 does not reflect the setting information.

As described above, because the screens at which the MFP 101 accepts the setting information from the communication terminal 102 are restricted to the screens illustrated in FIGS. 5 (5A and 5B), the pop-up 402 relating to the scan and transmit function 303 are suppressed from being displayed when the user operation is being executed at another screen (e.g., copy screen).

Next, destination restriction set to the MFP 101 will be described. When the destination restriction is set to ON, a specification method of the destination used for transmitting image data is restricted to the specification method in which the destination is selected from the address book or a one-touch key previously registered in the MFP 101. In this case, for example, the MFP 101 transitions into an operation mode in which the user is prohibited from specifying the destination by inputting a character string or a numeral of the destination through a software keyboard (not illustrated). Hereinafter, the operation in which the user manually inputs a character string or a numeral of the destination is called as a new input of the destination.

When the destination restriction is set to OFF, the MFP 101 is brought into an operation mode in which the specification method of the destination is not restricted. In this case, the MFP 101 can accept a new input of the destination through the scan and transmit screen 404. The administrator of the MFP 101 can operate the operation unit 116 to set the destination restriction to ON or OFF. This setting is stored in the RAM 113 or the storage 114.

Herein, a situation in which the MFP 101 receives setting information including destination information from the communication terminal 102 is considered. In many cases, a destination specified by the communication terminal 102 is different from the destination registered in the address book of the MFP 101.

Conventionally, in a case where the setting information including a destination is transmitted from the communication terminal 102 in a state where the destination restriction is set to ON, how the MFP 101 operates in the above state has not been taken into consideration. In consideration of the above-described situation, in the present exemplary embodiment, description is provided with respect to a system enabling the MFP 101 to appropriately restrict setting of destination information executed in association with the external apparatus according to the setting state of the destination restriction.

Figure 6:
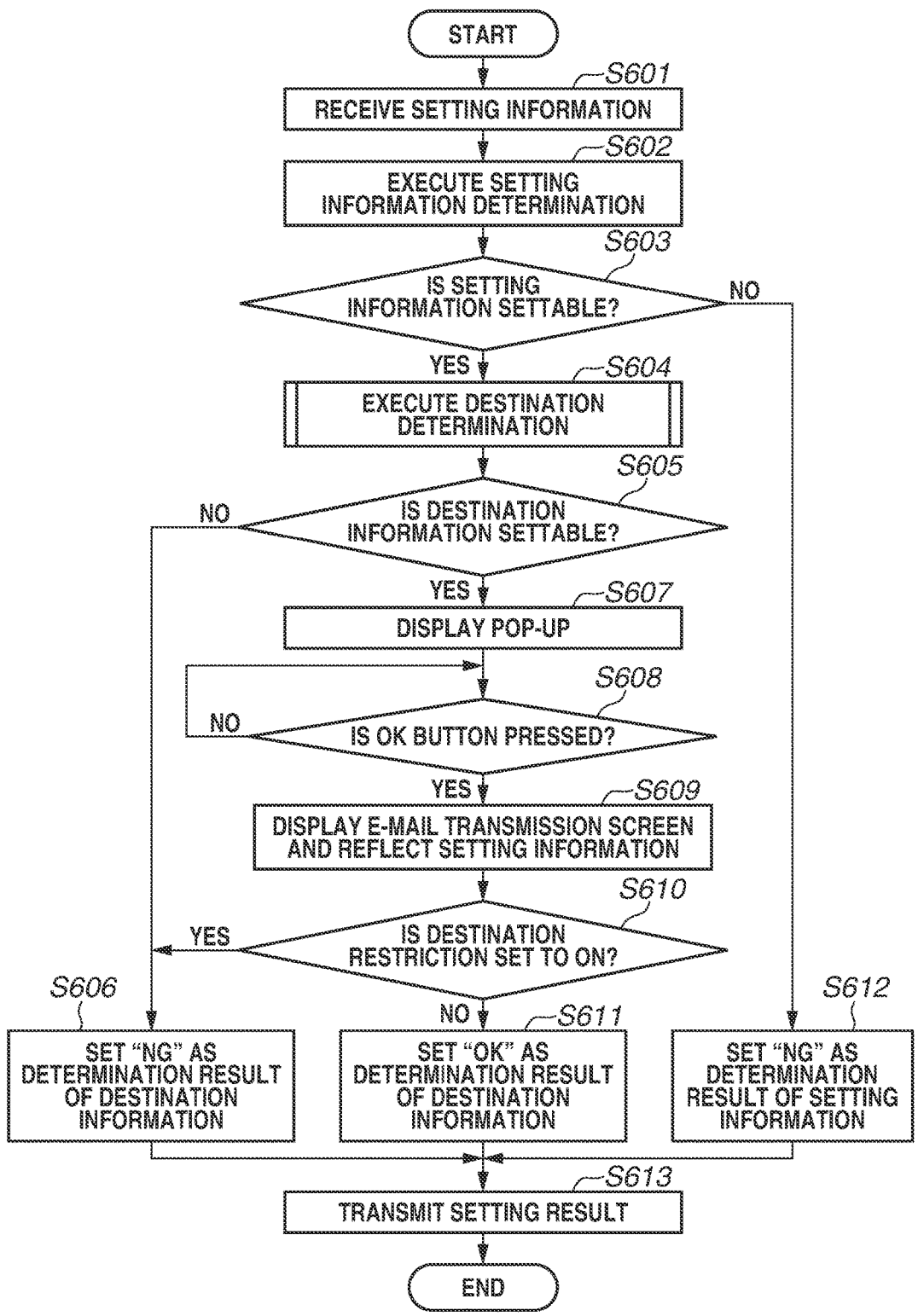
FIG. 6 is a flowchart illustrating setting control processing.

A specific system will be described with reference to a flowchart in FIG. 6. FIG. 6 is a flowchart illustrating setting control processing executed by the MFP 101. The MFP 101 executes the control illustrated in FIG. 6 when setting information is transmitted from the communication terminal 102. In addition, the CPU 111 reads a control program stored in the ROM 112 or the storage 114 to the RAM 113 to execute the processing illustrated in the flowchart in FIG. 6. The CPU 111 monitors data received from the communication unit I/F 125 or the wireless communication unit I/F 121 through a reception unit of network packets.

In step S601, the CPU 111 receives the setting information transmitted from the communication terminal 102 via the network 108 or the wireless communication 106. Next, in step S602, the CPU 111 determines whether the received setting information is settable. Specifically, when the setting information is an e-mail address, the CPU 111 determines whether the number of the e-mail addresses does not exceed the maximum number of settable destinations, or whether a length of the character string of the e-mail address does not exceed a settable range. If a setting item such as a subject or a main message of the e-mail is included in the setting information, the CPU 111 determines whether the setting item is data of a normal character string or whether a length of the character string does not exceed the maximum length of the character string.

The CPU 111 determines whether a session ID included in the setting information matches with the session ID temporarily stored in the RAM 113. If any one of the plurality of setting items is determined as "NG", the CPU 111 determines that the received setting information is not settable. If none of the plurality of setting items is determined as "NG" (i.e., all of the setting items are determined as "OK"), the CPU 111 determines that the received setting information is settable.

Next, in step S603, based on the determination result in step S602, the CPU 111 determines whether the setting information is settable as an e-mail transmission setting. If the CPU 111 determines that the setting information is settable (YES in step S603), the processing proceeds to step S604. If the CPU 111 determines that the setting information is not settable (NO in step S603), the processing proceeds to step S612. In step S604, the CPU 111 determines whether it is possible to set the destination.

Figure 7:
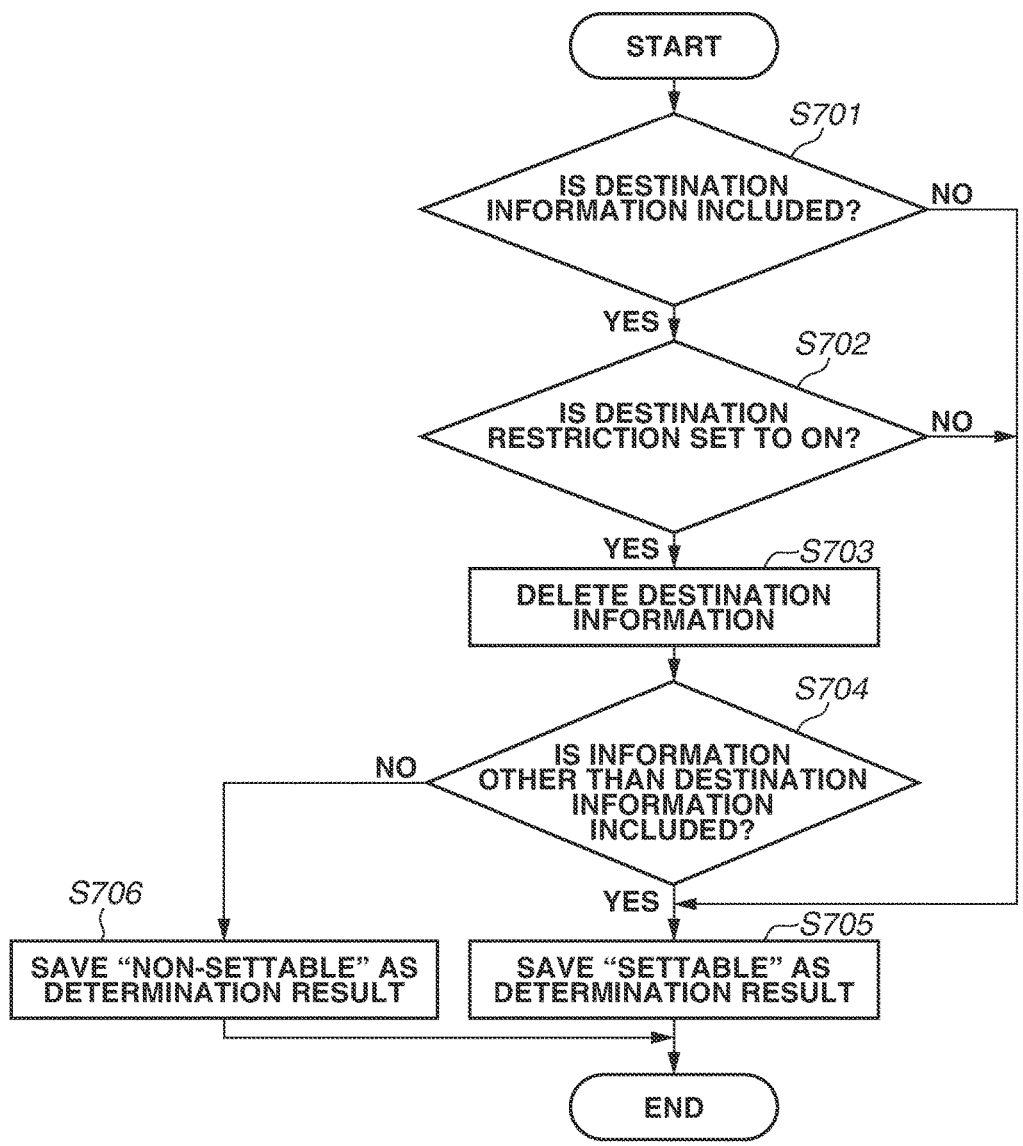
FIG. 7 is a flowchart illustrating destination determination processing.

FIG. 7 is a flowchart illustrating details of the destination determination processing executed in step S604. In step S701, the CPU 111 determines whether destination information that specifies a destination is included in the received setting information. If the CPU 111 determines that the destination information is included in the e-mail address field of the received setting information (YES in step S701), the processing proceeds to step S702. If the CPU 111 determines that the destination information is not included in the e-mail address field of the received setting information and the e-mail address field is blank (NO in step S701), the processing proceeds to step S705.

In step S702, the CPU 111 determines whether the destination restriction is set to ON as a setting of the MFP 101. The CPU 111 refers to the setting of the destination restriction stored in the RAM 113 or the storage 114. If the destination restriction is set to ON (YES in step S702), the processing proceeds to step S703. If the CPU 111 determines that the destination restriction is set to OFF (NO in step S702), the processing proceeds to step S705. In step S703, the CPU 111 deletes the destination information included in the setting information by overwriting the e-mail address field with blank data.

Next, in step S704, the CPU 111 determines whether information other than the destination information is included in the setting information. If the CPU 111 determines that information other than the destination information is included (YES in step S704), the processing proceeds to step S705. If the CPU 111 determines that information other than the destination information is not included (NO in step S704), the processing proceeds to step S706. In a case where the destination restriction is enabled in the MFP 101, based on the processing in steps S703 and S704, destination information is deleted while the information such as the subject, the main message, or the file name can be set as a setting of the scan and transmit function 303 if the above-described information is included in the setting information in addition to the destination information.

In step S705, the CPU 111 saves "settable" as a determination result and ends the processing. In step S706, the CPU 111 saves "non-settable" as a determination result and ends the processing.

Returning to the processing in FIG. 6, after the determination processing in step S604, in step S605, the CPU 111 determines whether destination information is settable. If "settable" is stored as the determination result in step S604 (YES in step S605), the processing proceeds to step S607. If "non-settable" is stored as the determination result in step S604 (NO in step S605), the processing proceeds to step S606. In step S606, the CPU 111 sets "NG" as a result of the setting processing of the destination information, and the processing proceeds to step S613.

In step S607, the CPU 111 displays the pop-up 402 and waits for the OK button 403 to be pressed. Next, in step S608, when the CPU 111 determines that the OK button 403 is pressed (YES in step S608), the processing proceeds to step S609. In step S609, the CPU 111 shifts the screen displayed on the operation unit 116 to the scan and transmit screen 404. The CPU 111, based on the received setting information, sets a transmission setting and a transmission destination of the scan and transmit screen 404. In addition, if the destination information is deleted in step S604, the information other than the destination information included in the received setting information is set thereto. In other words, the CPU 111 executes control for not setting the destination information when the destination restriction is set to ON, and executes control for setting the information other than the destination information. When the destination restriction is set to OFF, the CPU 111 executes control for setting the respective setting items to the settings of the transmission function based on the received setting information regardless of whether destination information is included in the setting information.

Next, in step S610, the CPU 111 determines whether the destination restriction is set to ON. If the CPU 111 determines that the destination restriction is set to ON (YES in step S610), the processing proceeds to step S606. If the CPU 111 determines that the destination restriction is set to OFF (NO in step S610), the processing proceeds to step S611. In step S611, the CPU 111 sets OK as a result of the setting processing of the destination information, and the processing proceeds to step S613. In step S612, the CPU 111 sets "NG" indicating a cause of an occurred error as a result of the setting processing, and the processing proceeds to step S613. In step S613, the CPU 111 transmits a result of the setting processing to the communication terminal 102 and ends the processing.

The communication terminal 102 displays a notification based on the received result of the setting processing. When "NG" is received as a result of the setting processing of the destination information, the communication terminal 102 notifies the user that setting of the e-mail address cannot be executed because there is a restriction in setting a new destination. The communication terminal 102 can notify the user that setting of a main message, a subject, or a file name has been executed in addition to notifying the user of the above-described information. When "OK" is received as a result thereof, the communication terminal 102 notifies the user that the setting is executed or transmission can be started via the operation unit 116 of the MFP 101. When "NG" is received as a result thereof, the communication terminal 102 notifies the user that the setting processing has failed.

As described above, the MFP 101 according to the present exemplary embodiment executes control for setting the destination information only when the destination restriction is set to OFF and not setting the destination information when the destination restriction is set to ON. With this configuration, the MFP 101 can appropriately restrict setting of the destination information received from the external apparatus, enhancing security.

In particular, convenience of the user as well as a security function can be ensured in an operational environment known as "bring your own device (BYOD)", in which a user brings the user's own communication terminal (e.g., smartphone) to, for example, the user's office and operates the communication terminal. Specifically, because a part of the setting items such as a main message, a subject, and a file name can be settable when the MFP 101 associates with the communication terminal, convenience of the user is improved compared to a case where association with the communication terminal is uniformly prohibited. The MFP 101 can appropriately restrict the destination setting associated with the communication terminal when the destination restriction is set as a security setting.

Figure 8:
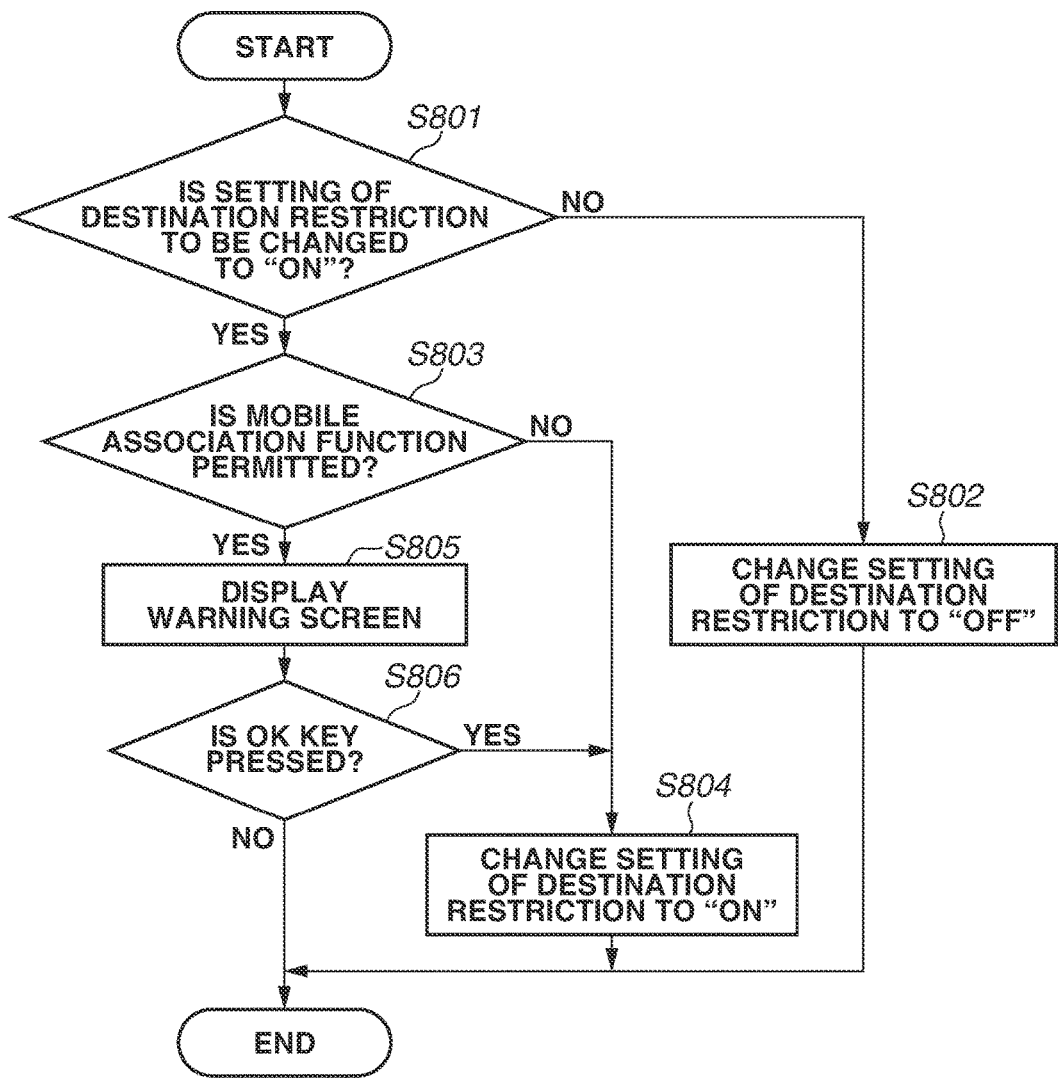
FIG. 8 is a flowchart illustrating setting change processing.

Next, description will be provided with respect to setting change processing of the destination restriction executed by the MFP 101. FIG. 8 is a flowchart illustrating the setting change processing executed by the MFP 101. The setting change processing is started when the user selects a destination restriction function key (not illustrated) to change a setting of the destination restriction via a setting screen (not illustrated) of the MFP 101.

In step S801, the CPU 111 determines whether a user instruction for changing the setting of the destination restriction to ON is received. If the CPU 111 receives the user instruction for changing the setting of the destination restriction to ON (YES in step S801), the processing proceeds to step S803. If the CPU 111 receives the user instruction for changing the setting of the destination restriction to OFF (NO in step S801), the processing proceeds to step S802. In step S802, the CPU 111 changes the setting of the destination restriction to OFF and ends the processing. In addition, the ON/OFF setting of the destination restriction is stored in the RAM 113 or the storage 114 as one of the setting items of the general operation of the MFP 101.

In step S803, the CPU 111 determines whether a setting in which the MFP 101 is permitted to accept the setting information associated with an external device (hereinafter, referred to as "mobile association function") is enabled. If the CPU 111 determines that the setting in which the mobile association function is permitted is enabled (YES in step S803), the processing proceeds to step S805. If the CPU 111 determines that the setting in which the mobile association function is prohibited is enabled (NO in step S803), the processing proceeds to step S804. In step S804, the CPU 111 changes the setting of the destination restriction to ON and ends the processing.

Figure 9:
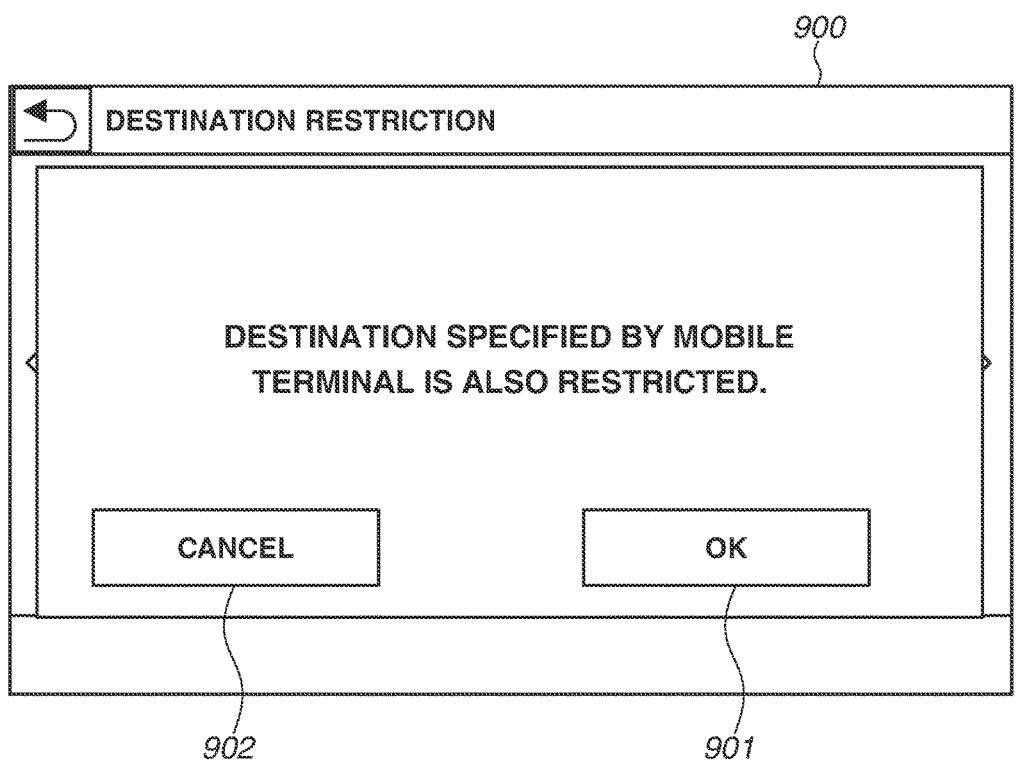
FIG. 9 is a diagram illustrating an example of a warning screen.

In step S805, the CPU 111 displays a warning screen on the operation unit 116. FIG. 9 is a diagram illustrating an example of a warning screen 900. The warning screen 900 is provided as a pop-up screen. The warning screen 900 is a screen for notifying the user that setting of destination information received from the communication terminal 102 is restricted. The processing in step S805 is one example of display processing. The user can change the setting of the destination restriction to ON by pressing an OK key 901.

The user can cancel the change of the setting of the destination restriction (i.e., the setting of the destination restriction remains OFF without being changed to ON) by pressing a cancel key 902.

Referring back to FIG. 8, after the processing in step S805, in step S806, the CPU 111 executes determination of a user instruction. If the CPU 111 determines that the OK key 901 is pressed (YES in step S806), the processing proceeds to step S804. If the CPU 111 determines that the cancel key 902 is pressed (NO in step S806), the CPU 111 cancels the change of the setting and ends the processing.

As described above, when the MFP 101 receives the user instruction for changing the setting of the destination restriction to ON, the MFP 101 can notify the user that setting of the destination information associated with the communication terminal 102 is also restricted. The change of the setting can be cancelled via the warning screen 900. This configuration provides for additional added convenience of the user.

A variation example of the warning will now be described. While the MFP 101 displays the warning screen 900 when the setting of the destination restriction is changed to ON, the exemplary embodiment is not limited thereto. For example, the MFP 101 can display the warning screen 900 when the setting of the mobile association function is changed from "prohibited" to "permitted". In this case, the CPU 111 determines whether the setting of the destination restriction is ON when the MFP 101 receives the user instruction for changing the setting of the mobile association function to "permitted". When the CPU 111 determines that the setting of the destination restriction is ON, the CPU 111 can provide a warning notification indicating that the destination associated with the communication terminal 102 is not settable because the destination restriction is set to ON.

An image processing system 100 according to a second exemplary embodiment will now be described. There is a case where destination information received from a communication terminal 102 matches with an address (destination information) registered in an address book of an MFP 101. In the present exemplary embodiment, even if the destination restriction is set to ON, setting of destination information is executed if a destination received from the communication terminal 102 matches with the destination registered in the address book. In addition, in the present exemplary embodiment, a hardware configuration of an apparatus is the same as that of the first exemplary embodiment. Detailed description of the configuration similar to that of the first exemplary embodiment is omitted. Hereinafter, description will be provided with respect to a configuration of the image processing system 100 according to the present exemplary embodiment, which is different from that of the image processing system 100 described in the first exemplary embodiment.

FIG. 10 is a flowchart illustrating details of the destination determination processing executed in step S604 according to the present exemplary embodiment. The flowchart in FIG. 10 illustrates processing steps executed in place of the respective processing steps of the destination determination processing according to the first exemplary embodiment in FIG. 7. The same reference numerals are applied to the processing steps of FIG. 10 as those illustrated in the flowchart in FIG. 7. The flowchart in FIG. 10 is different in that determination processing in step S1001 is added to the flowchart in FIG. 7. In step S702, if the CPU 111 determines that the destination restriction is set to ON (YES in step S702), the processing proceeds to step S1001. In step S1001, the CPU 111 determines whether the same destination as the destination indicated by the destination information included in the setting information, has previously been registered (set) in the address book of the MFP 101.

If the CPU 111 determines that the same destination has been registered (YES in step S1001), the processing proceeds to step S705. If the CPU 111 determines that the same destination has not been registered (NO in step S1001), the processing proceeds to step S703. In a case where a plurality of pieces of destination information is specified as the setting information, the CPU 111 determines whether each of the destinations has been registered in the address book. If all of the destinations included in the setting information have been registered in the address book, the CPU 111 determines that the destinations have previously been registered, and the processing proceeds to step S705. If any one of the destinations included in the setting information has not been registered in the address book, the CPU 111 determines that the destination has not been registered, and the processing proceeds to step S703.

The rest of the configurations and the processing steps of the image processing system 100 according to the present exemplary embodiment are similar to the configurations and the processing steps of the image processing system 100 described in the first exemplary embodiment. Through the above-described processing, even if the destination restriction is set to ON, the MFP 101 can execute control for setting the destination information if the destination information is the same as the destination previously registered in the address book.

While the present invention has been described in detail with reference to exemplary embodiments, it is to be understood that the above-described exemplary embodiments are limiting. Variations that do not depart from the essential spirit of the above-described exemplary embodiments are included within the scope of the above-described exemplary embodiments. A part of the exemplary embodiments can be combined as appropriate.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198134, filed Oct. 6, 2016, which is hereby incorporated by reference herein in its entirety.

What is claimed is:

1. An image processing apparatus including a transmission function for transmitting an image, the image processing apparatus comprising:
   at least one processor; and
   at least one memory storing computer executable instructions that, when executed by the at least one processor, cause the at least one processor to perform operations comprising:
   transmitting an image to a set transmission destination;
   setting whether to permit use of a previously un-registered destination as a transmission destination of the transmission function to which the image is transmitted;
   receiving data including at least a destination field from a mobile terminal; and
   controlling the image processing apparatus to set the transmission destination based on destination information included in the destination field of the received data upon a condition that a setting is set permitting use of a previously un-registered destination and not to set the transmission destination based on the destination information included in the destination field of the received data upon a condition that a setting is set prohibiting use of a previously un-registered destination.

2. The image processing apparatus according to claim 1, wherein the at least one processor perform operations further comprising receiving, from a mobile terminal, data including at least a destination field and a data field in which one or more transmission settings to be used for the transmission function are stored, and
   wherein, upon the condition that the setting not permitting the use of a previously un-registered destination is set, the image processing apparatus does not set the transmission destination based on the destination information included in the destination field and sets setting information included in the data field included in the received data as a transmission setting of the transmission function based on the setting information.

3. The image processing apparatus according to claim 1, wherein the at least one processor performs operations further comprising:
   accepting an instruction for changing the setting set; and
   providing a notification that a transmission destination setting associated with the mobile terminal cannot be made upon a condition that an instruction for changing a setting to a setting not permitting the use of a previously un-registered destination as a transmission destination is accepted.

4. The image processing apparatus according to claim 1, wherein the at least one processor performs operations further comprising displaying a plurality of previously un-registered destinations and setting a destination selected from among the plurality of displayed destinations as a transmission destination to transmit an image, and wherein, upon a condition that the destination information included in the destination field is determined to match any one of a plurality of previously registered destinations, the image processing apparatus sets a transmission destination based on the destination information included in the destination field even upon a condition that the setting not permitting the use of a previously un-registered destination is set.

5. The image processing apparatus according to claim 1 further comprising a scanner device configured to scan an original document,
wherein the at least one processor performs an operation to transmit an image acquired by scanning the original document to the transmission destination.

6. The image processing apparatus according to claim 1, wherein data transmitted from the mobile terminal includes at least any one of settings of destination information, a subject used for transmission, a main message, or a file name of an attachment file.

7. The image processing apparatus according to claim 1, wherein receipt of the data from the mobile terminal is via wireless communication.

8. The image processing apparatus according to claim 1, wherein, upon the image processing apparatus not setting the transmission destination based on the data received from the mobile terminal, a predetermined notification is transmitted to the mobile terminal.

9. The image processing apparatus according to claim 8, wherein the predetermined notification is a notification indicating that a transmission destination cannot be set.

10. The image processing apparatus according to claim 1,
wherein the at least one processor performs an operation further comprising prompting a user to input characters and accepting manual input of a transmission destination, and
wherein, upon the condition that the setting prohibiting a previously un-registered destination is set, the manual input of the transmission destination is not accepted.

11. The image processing apparatus according to claim 1,
wherein the destination information included in the destination field received from the mobile terminal is a destination set in response to receipt of a user operation to select an address from an address book of the mobile terminal.

12. The image processing apparatus according to claim 1, wherein the destination information included in the destination field received from the mobile terminal is a destination set by directly inputting a character string indicating a destination according to a user operation via an operation unit of the mobile terminal.

13. A control method of an image processing apparatus including a transmission function for transmitting an image, the control method being executed by a processor, and the control method comprising:
transmitting an image to a set transmission destination;
setting whether to permit use of a previously un-registered destination as a transmission destination of the transmission function to which the image is transmitted;
receiving data including at least a destination field from a mobile terminal; and
controlling the image processing apparatus to set the transmission destination based on destination information included in the destination field of the received data upon a condition that a setting is set permitting use of a previously un-registered destination and not to set the transmission destination based on the destination information included in the destination field of the received data upon a condition that a setting is set prohibiting use of a previously un-registered destination.

14. A non-transitory computer-readable storage medium storing computer-executable instructions for causing a computer to execute a control method of an image processing apparatus including a transmission function for transmitting an image, the control method comprising:
transmitting an image to a set transmission destination;
setting whether to permit use of a previously un-registered destination as a transmission destination of the transmission function to which the image is transmitted;
receiving data including at least a destination field from a mobile terminal; and
controlling the image processing apparatus to set the transmission destination based on destination information included in the destination field of the received data upon a condition that a setting is set permitting use of a previously un-registered destination and not to set the transmission destination based on the destination information included in the destination field of the received data upon a condition that a setting is set prohibiting use of a previously un-registered destination.

* * * * *